United States Patent
Kataoka

(10) Patent No.: US 7,241,231 B2
(45) Date of Patent: Jul. 10, 2007

(54) RUBBER COMPOSITION FOR GOLF BALL AND GOLF BALL

(75) Inventor: Nobuyuki Kataoka, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 11/060,531

(22) Filed: Feb. 18, 2005

(65) Prior Publication Data

US 2005/0143193 A1 Jun. 30, 2005

Related U.S. Application Data

(63) Continuation of application No. 10/284,317, filed on Oct. 31, 2002, now abandoned, which is a continuation-in-part of application No. 10/206,816, filed on Jul. 29, 2002, now abandoned.

(30) Foreign Application Priority Data

Dec. 19, 2001 (JP) ............................. 2001-385555

(51) Int. Cl.
*A63B 37/00* (2006.01)

(52) U.S. Cl. ...................................... 473/351

(58) Field of Classification Search ................ 473/351, 473/368, 377
See application file for complete search history.

(56) References Cited

U.S. PATENT DOCUMENTS

| | | | |
|---|---|---|---|
| 4,220,564 | A | 9/1980 | Tanimoto et al. |
| 4,683,257 | A | 7/1987 | Kakiuchi et al. |
| 4,929,678 | A | 5/1990 | Hamada et al. |
| 5,585,440 | A | 12/1996 | Yamada et al. |
| 6,277,920 | B1 | 8/2001 | Nesbitt |
| 6,315,679 | B1 | 11/2001 | Sano |
| H2036 | H | 7/2002 | Bush |
| 6,465,546 | B1 | 10/2002 | Jackson et al. |
| 6,486,261 | B1 | 11/2002 | Wu et al. |
| 2002/0065148 | A1 | 5/2002 | Yokota et al. |

FOREIGN PATENT DOCUMENTS

| | | |
|---|---|---|
| JP | 4-31973 A | 11/1992 |
| JP | 63-223048 A | 9/1998 |

*Primary Examiner*—Raeann Trimiew
(74) *Attorney, Agent, or Firm*—Sughrue Mion, PLLC

(57) ABSTRACT

A rubber composition for a one-piece golf ball or the solid core of a multilayer structure solid golf ball having a solid core enclosed with a cover directly or via an intermediate layer is provided comprising a base rubber, a dry preblend of an unsaturated carboxylic acid metal salt with a solid rubber having a Mooney viscosity ($ML_{1+4}$, 100° C.) of 5–150, and an organic peroxide.

Figure 1:
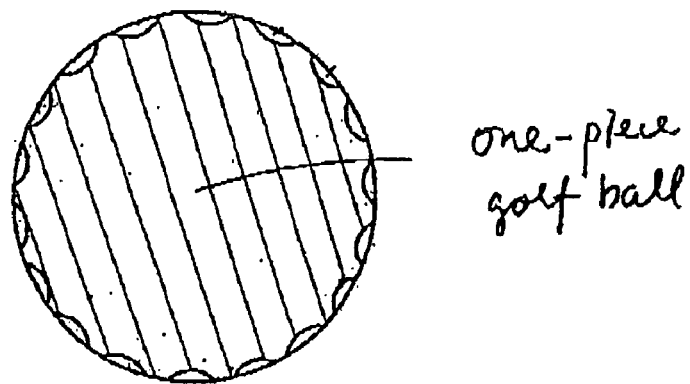
Figure 2:
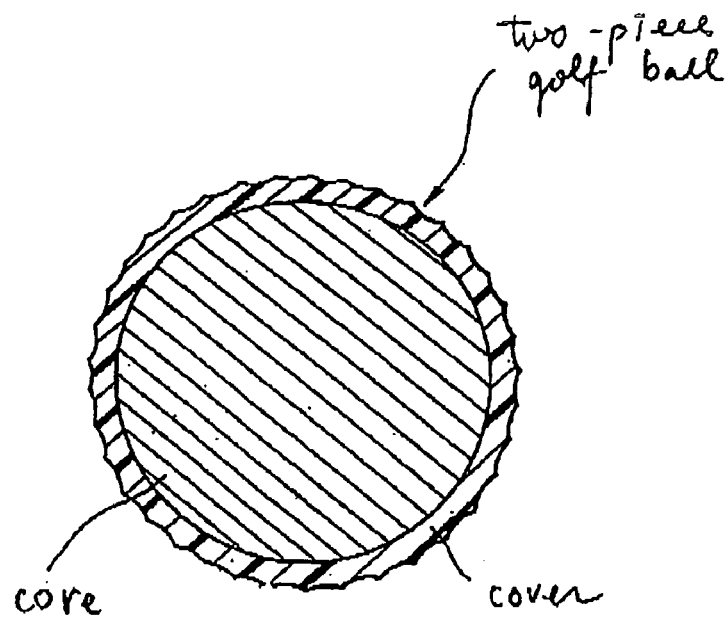

4 Claims, 1 Drawing Sheet one-piece golf ball two-piece golf ball core  cover

RUBBER COMPOSITION FOR GOLF BALL AND GOLF BALL

CROSS REFERENCE TO RELATED APPLICATION

This application is a continuation of application Ser. No. 10/284,317 filed Oct. 31, 2002, now abandoned, which is a continuation-in-part of application Ser. No. 10/206,816 filed on Jul. 29, 2002, now abandoned, the entire contents of both are hereby incorporated by reference.

BACKGROUND OF THE INVENTION

This invention relates to rubber compositions capable of forming golf balls having an appropriate hardness and improved rebound characteristics and exhibiting stabilized flight performance, and golf balls using the same.

In general, one-piece golf balls or the solid cores of multilayer structure solid golf balls having a solid core enclosed with a cover directly or via an intermediate layer are manufactured by molding under heat and pressure a rubber composition comprising a rubber component such as polybutadiene rubber, a metal salt of an unsaturated carboxylic acid as a co-crosslinking agent, zinc oxide as a weight modifier, and a free-radical initiator such as dicumyl peroxide.

With respect to the metal salt of an unsaturated carboxylic acid used as the co-crosslinking agent in the above rubber composition, use of zinc methacrylate and zinc acrylate is believed preferable from the standpoints of ball hardness and rebound. Typically zinc methacrylate and zinc acrylate are blended in large amounts with the rubber component such as polybutadiene. When a rubber composition is obtained by mixing or kneading the respective components, the kneading operation is very difficult because the zinc salt in fine powder form scatters much and heavily sticks to the roll mill or kneader.

Since the zinc unsaturated carboxylates, when blended in the compositions, are poorly dispersible and liable to form agglomerates in the compositions, they are not effectively utilized, sometimes inviting a loss of resilience and a failure to acquire a certain hardness.

One common approach for avoiding the unsaturated carboxylic acid metal salts from sticking to the kneader is to use metal salts of higher fatty acid as a lubricant. In order for these fatty acid metal salts to exert the desired effects, the kneading temperature must be elevated to as high as about 100° C., but a problem of scorching occurs at such elevated temperatures.

U.S. Pat. No. 5,096,943 describes a rubber composition obtained by suspending a metal salt of α,β-ethylenically unsaturated carboxylic acid in an aliphatic hydrocarbon solvent and mixing the suspension with a polymer solution. This method necessitates removal of the solvents at the end of liquid mixing.

U.S. Pat. No. 5,096,201 uses a rubber composition obtained by previously mixing and dispersing a metal salt of unsaturated carboxylic acid in liquid rubber, and kneading it in a rubber compound. Presumably the liquid rubber used herein can reduce the rebound of the golf ball obtained therefrom.

SUMMARY OF THE INVENTION

An object of the invention is to provide rubber compositions capable of forming solid golf balls having an appropriate hardness and improved rebound characteristics and exhibiting stabilized flight performance, and golf balls using the same.

To attain the above object, the present invention provides (1) a rubber composition for a one-piece golf ball or the solid core of a multilayer structure solid golf ball having a solid core enclosed with a cover directly or via an intermediate layer, comprising a base rubber, a dry preblend of an unsaturated carboxylic acid metal salt with a solid rubber having a Mooney viscosity ($ML_{1+4}$, 100° C.) of 5 to 150, and an organic peroxide;

(2) a one-piece golf ball characterized by being formed of the above rubber composition;

(3) a multilayer structure solid golf ball having a solid core enclosed with a cover directly or via an intermediate layer, characterized in that the solid core is formed of the above rubber composition.

More particularly, the solid golf ball of the invention is constructed of a rubber composition which is prepared by compounding a metal salt of an unsaturated carboxylic acid such as zinc methacrylate or zinc acrylate as a co-crosslinking agent in a rubber compound. According to the invention, the metal salt of unsaturated carboxylic acid is previously mixed and dispersed in a solid rubber such as a solid-state 1,4-polybutadiene before the preblend is compounded in the rubber compound. This approach, which does not resort to the solvent and liquid rubber used in the prior art techniques, prevents the co-crosslinking agent from scattering during the kneading operation of the rubber composition and also prevents the co-crosslinking agent from sticking to the roll mill or kneader to reduce the amount of the crosslinking agent dispersed in the composition. Then the co-crosslinking agent can be uniformly and effectively dispersed at low temperature without forming agglomerates.

Accordingly, the solid golf balls of the invention are constructed of the rubber composition in which the co-crosslinking agent is uniformly and effectively dispersed at low temperature. By molding and vulcanizing the rubber composition, a uniform one-piece golf ball or a uniform solid core for a multilayer structure solid golf ball is formed. As a result, solid golf balls having an appropriate hardness and improved rebound characteristics and exhibiting stabilized flight performance can be consistently manufactured.

DETAILED DESCRIPTION OF THE INVENTION

As described above, the rubber composition of the invention has compounded therein a dry preblend of an unsaturated carboxylic acid metal salt as the co-crosslinking agent with a solid rubber.

The unsaturated carboxylic acid metal salts used herein include zinc and magnesium salts of acrylic acid, methacrylic acid, maleic acid and the like. Most preferably, zinc acrylate or zinc methacrylate is used. The unsaturated carboxylic acid metal salts may be either of completely neutralized form or of partially neutralized form as shown below.

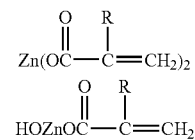

R is hydrogen or methyl.

The solid rubbers with which the unsaturated carboxylic acid metal salts are preblended include solid-state polybutadiene, solid-state polyisoprene, solid-state butadiene-isoprene copolymers, solid-state butadiene-styrene copolymers, solid-state polybutene, solid-state ethylene-propylene rubber, and analogous rubbers having a Mooney viscosity ($ML_{1+4}$, 100° C.) of 5 to 150, the lower limit of Mooney viscosity being preferably 20, more preferably 30, and sometimes 40, and the upper limit being preferably 100, more preferably 80, and sometimes 60. It is preferred to use a solid rubber of the same type as the base rubber to be described later. The unsaturated carboxylic acid metal salt used in mixing with and dispersing in the solid rubber may be one which has been prepared in metal salt form. Alternatively, the metal salt can be arrived at by reacting an unsaturated carboxylic acid with a metal oxide, hydroxide or the like in the solid rubber. A Mooney viscosity of less than 5 leads to a lowering of resilience whereas a Mooney viscosity of more than 150 leads to a productivity drop because of time-consuming preparation of a preblend.

The mixing ratio of the unsaturated carboxylic acid metal salt to the solid rubber is preferably such that at least 50 parts by weight, especially at least 200 parts by weight and up to 1,000 parts by weight, especially up to 500 parts by weight of the unsaturated carboxylic acid metal salt is present per 100 parts by weight of the solid rubber. Too small amounts of the unsaturated carboxylic acid metal salt would require the preblend be compounded in more amounts. Too large amounts of the unsaturated carboxylic acid metal salt would result in that the preblend is difficult to prepare.

The preblend can be prepared by dry blending the unsaturated carboxylic acid metal salt with the solid rubber in a predetermined ratio, using a mixing machine such as a kneader or roll mill. During the dry blending, the unsaturated carboxylic acid metal salt is preferably added in three or more divided portions at a temperature of 80 to 110° C., preferably 80 to 100° C. This addition method is recommended particularly when a kneader is used.

The unsaturated carboxylic acid metal salt as the co-crosslinking agent is added to and mixed with a rubber composition from which one-piece golf balls or solid cores of multilayer structure solid golf balls are constructed, while it is in dry preblend with the solid rubber. The amount of unsaturated carboxylic acid metal salt added is preferably 10 to 50 parts by weight, especially 15 to 40 parts by weight per 100 parts by weight of the base rubber component in the rubber composition. As to the solid rubber in which the unsaturated carboxylic acid metal salt has been mixed and dispersed, its amount is included in the base rubber component.

The base rubber in the rubber composition may be any desired one selected from those rubbers commonly used as one-piece golf ball materials or solid core materials of multilayer structure solid golf balls. Preferably a 1,4-polybutadiene rubber containing at least 40% by weight of cis-structure is used. The most preferred base rubber is a 1,4-polybutadiene rubber containing at least 90% by weight of cis-structure while the preferred solid rubber is a 1,4-polybutadiene rubber containing at least 90% by weight of cis-structure as well. In this embodiment, styrene-butadiene rubber, polyisoprene rubber or the like may be compounded with the 1,4-polybutadiene rubber.

In the rubber composition, an organic peroxide such as dicumyl peroxide is blended as a free-radical initiator, preferably in an amount of 0.3 to 3 parts by weight, especially 0.7 to 2 parts by weight per 100 parts by weight of the rubber component.

If necessary, in the rubber composition, there may be suitably compounded zinc oxide, plasticizers, antioxidants, organic sulfur compounds and other components which can be commonly used in the preparation of one-piece golf balls and solid cores of multilayer structure solid golf balls.

For the manufacture of solid golf balls of the invention, the rubber composition formulated as above is mixed in a suitable mixing machine such as a roll mill, kneader or Banbury mixer, and heat compression molded in a mold, thereby producing a one-piece golf ball or a solid core of a multilayer structure solid golf ball. The vulcanizing and molding conditions used herein are as conventional.

In the case of multilayer structure solid golf balls such as two-piece balls, the solid core formed of the above rubber composition is enclosed with a cover directly or after being enclosed with an intermediate layer. The materials used for the intermediate layer and cover may be conventional cover materials such as ionomer resins, polyester, polyurethane and nylon.

Since the rubber composition of the invention avoids scattering and sticking to the mixing machine of the unsaturated carboxylic acid metal salt as the co-crosslinking agent during the kneading operation, allows the co-crosslinking agent to be uniformly and effectively dispersed at low temperature, and eliminates a need for solvent and liquid rubber, golf balls having an appropriate hardness and improved rebound characteristics and exhibiting stabilized flight performance can be produced therefrom at a low cost and high productivity.

EXAMPLE

Examples and Comparative Examples are given below for illustrating the invention, but the invention is not limited to the following Examples.

Examples 1–8 & Comparative Examples 1–2

Preparation of Master Batch

Master batches were prepared by kneading zinc acrylate with BR01 (by JSR, solid-state cis-1,4-polybutadiene, $ML_{1+4}$=44, same hereinafter) in the amounts shown below, in a kneader and a roll mill.

Rubber compositions of Examples shown in Table 1 were prepared by using a kneader and kneading the components in one-stage at an initial temperature of 40° C. and a maximum temperature of 90° C. Rubber compositions of Comparative Examples were prepared by kneading in conventional non-professional and professional two stages. Using a mold, the rubber compositions were then heat compression molded at 160° C. for 14–17 minutes to form solid cores having a diameter of 39.2 mm. They were determined for hardness and initial velocity by the following tests. The results are shown in Table 1.

|  | Master batch 1 |
|---|---|
| BR01 | 100 pbw (parts by weight) |
| Zinc acrylate | 1,000 pbw |
|  | Master batch 2 |
| BR01 | 100 pbw |
| Zinc acrylate | 333 pbw |
|  | Master batch 3 |
| BR01 | 100 pbw |
| Zinc acrylate | 200 pbw |
|  | Master batch 4 |
| BR01 | 100 pbw |
| Zinc acrylate | 100 pbw |

Core Hardness

Hardness is expressed by a deflection of a solid core under an applied load of 100 kgf. A larger value indicates a softer core.

Core Initial Velocity

Measured by an initial velocity meter of the same type as authorized by USGA.

TABLE 1

| Component (pbw) | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|
| BR01 | 98.2 | 97.5 | 94.6 | 92.5 | 91.0 | 87.5 | 82.0 | 75.0 | 100 | 100 |
| Master batch 1 | 19.8 | 27.5 | | | | | | | | |
| Master batch 2 | | | 23.4 | 32.5 | | | | | | |
| Master batch 3 | | | | | 27.0 | 37.5 | | | | |
| Master batch 4 | | | | | | | 36.0 | 50.0 | | |
| (total BR01 amount) | (100) | (100) | (100) | (100) | (100) | (100) | (100) | (100) | (100) | (100) |
| Zinc acrylate | | | | | | | | | 18.0 | 25.0 |
| Zinc oxide | 24.3 | 21.4 | 24.3 | 21.4 | 24.3 | 21.4 | 24.3 | 21.4 | 24.3 | 21.4 |
| Dicumyl peroxide | 1 | 1 | 1 | 1 | 1 | 1 | 1 | 1 | 1 | 1 |
| Sticking to kneader | no | no | no | no | no | no | no | no | yes | yes |
| Powder scattering | little | little | little | little | little | little | little | little | much | much |
| Core hardness (mm) | 4.15 | 2.99 | 4.11 | 2.94 | 4.10 | 2.95 | 4.10 | 2.94 | 4.29 | 3.06 |
| Core initial velocity (m/s) | 76.80 | 77.63 | 76.81 | 77.65 | 76.83 | 77.64 | 76.85 | 77.64 | 76.62 | 77.47 |

As is evident from Table, the compositions of Examples eliminate any sticking of zinc acrylate to the kneader and substantially suppress scattering of zinc acrylate powder. The solid cores obtained therefrom exhibit a higher initial velocity than the solid cores of Comparative Examples having an equal hardness.

The invention claimed is:

1. A method for preparing a one-piece golf ball or the solid core of a multilayer structure solid golf ball having a solid core enclosed with a cover directly or via an intermediate layer, comprising the steps of
    dry blending 100 to 1,000 parts by weight of an unsaturated carboxylic acid metal salt with 100 parts by weight of a solid rubber having a Mooney viscosity ($ML_{1+4}$, 100° C.) of 5 to 150 by using a mixing machine to prepare a dry preblend, wherein the unsaturated carboxylic acid metal salt is added in three or more divided portions at a temperature of 80 to 110° C.,
    mixing the dry preblend with a base rubber, an organic peroxide and zinc oxide by using a mixing machine to prepare a rubber composition,
    wherein the amount of the unsaturated carboxylic acid metal salt in the rubber composition is 10 to 50 parts by weight per 100 parts by weight of the total amount of the solid rubber and the base rubber, and
    heat compression molding the rubber composition to prepare at least one said one-piece golf ball or said solid core.

2. The method for preparing a one-piece golf ball or the solid core of a multilayer structure solid golf ball of claim 1, wherein 200 to 1,000 parts by weight of said unsaturated carboxylic acid metal salt is dry blended with 100 parts by weight of said solid rubber.

3. The method for preparing a one-piece golf ball or the solid core of a multilayer structure solid golf ball of claim 1, wherein said base rubber is a polybutadiene containing at least 90% by weight of cis- 1,4-bond and said solid rubber is a polybutadiene containing at least 90% by weight of cis-1,4-bond.

4. The method for preparing a one piece golf ball or the solid core of a multilayer structure solid golf ball of claim 1, wherein said unsaturated carboxylic acid metal salt is zinc acrylate or zinc methacrylate.

* * * * *